United States Patent [19]

Kojima

[11] 4,320,510

[45] Mar. 16, 1982

[54] ERROR DATA CORRECTING SYSTEM

[75] Inventor: Tadashi Kojima, Yokosuka, Japan

[73] Assignee: Tokyo Shibaura Denki Kabushiki Kaisha, Japan

[21] Appl. No.: 116,555

[22] Filed: Jan. 29, 1980

[30] Foreign Application Priority Data

Jan. 31, 1979 [JP] Japan .................................. 54-10101
Jan. 31, 1979 [JP] Japan .................................. 54-10102
Jan. 31, 1979 [JP] Japan .................................. 54-10103

[51] Int. Cl.³ ............................................. G06D 11/10
[52] U.S. Cl. ........................................ 371/37; 371/38
[58] Field of Search ........................ 371/37, 38, 39, 40

[56] References Cited

U.S. PATENT DOCUMENTS

| | | | |
|---|---|---|---|
| 3,629,824 | 12/1971 | Bossen | 371/38 |
| 3,697,948 | 10/1972 | Bossen | 371/38 |
| 3,766,521 | 10/1973 | Carter et al. | 371/38 |
| 3,868,632 | 2/1975 | Hong et al. | 371/38 |
| 4,160,236 | 7/1979 | Oka et al. | 371/37 |
| 4,242,752 | 12/1980 | Herkert | 371/37 |

Primary Examiner—Charles E. Atkinson

Attorney, Agent, or Firm—Finnegan, Henderson, Farabow, Garrett & Dunner

[57] ABSTRACT

An input data signal, in which n data words $W_1$ to $W_n$ and two check words P and Q are treated as one data block, is processed by P and Q decoding circuits. The decoded data $S_1$ and $T^{i-(n+1)}S_2$ from the decoding circuits are added to each other in an adder to generate $S_1 + T^{i(n+1)}S_2$ which is in turn selected by a gate circuit in accordance with a selection signal. The selection signal is supplied from an M matrix generator (MG) embodied as a linear feedback shift register for $H(x) = X^m + X^g + 1$. The initial value of the linear feedback shift register is set in accordance with the error word data derived from an error word control circuit and the order of the data to be decoded. The decoded data sequentially selected from the gate circuit are added by an adder to be the data $W_{je}$ to be decoded, while at the same time those are added to the $S_1$ by an adder to be the data $W_{ie}$ to be decoded. The data $W_{je}$ and $W_{ie}$ is added to the corresponding data words $W_i$ and $W_j$ of the input data signal having passed through a one-block delay circuit by an adder, whereby the error data are corrected.

4 Claims, 12 Drawing Figures

ERROR DATA CORRECTING SYSTEM

FIELD OF THE INVENTION

The invention relates to an error data correcting system adaptable for a system for transmitting, recording and reproducing digitized information signals by PCM (pulse code modulation), for example, and, more particularly, to improvements over an M matrix generator used in the error data correcting system.

BACKGROUND OF THE INVENTION

In an error data correcting system of this type, which has been proposed heretofore in this field, n data words W1 to Wn each containing m bits additionally include a first check code $$\left(P = \sum_{r=1}^{n} o\, W_r\right)$$

as the sum of bits corresponding to the data words and a second check code $$\left(Q = \sum_{r=1}^{n} oT^{(n+1)-r}\, W_r\right)$$

as the sum of the bits corresponding to the signals generated through the operation of a polynomial $X^m + X^g + 1$ by an auxiliary matrix (T). The error data correcting system can correct the error words up to two words by using an M matrix generator for decoding.

A ROM (read only memory) has generally been used for the M matrix generator for decoding, because of the time restriction in the decoding process.

In the case of an audio PCM recorder known as a record/reproduction system, for example, one word includes 12 to 16 bits, generally. If the error data correcting system is applied to such a system, the memory capacity of the ROM used must be considerably large and an address counter to control the ROM is further needed. The overall system accordingly is complicated in the circuit construction. Additionally, the number of components necessary when the circuit is fabricated by LSI technology, is enormous.

OBJECTS AND SUMMARY OF THE INVENTION

Accordingly, an object of the invention is to provide an error data correcting system which uses as an M matrix generator for decoding, a linear feedback shift register of $H(x) = X^m + X^g + 1$ allowing a reduction of the size of the system and high-speed processing of data.

Another object of the invention is to provide an error data correcting system with an M matrix generator for decoding which permits a greater decrease in the number of elements necessary for an LSI version of the circuit.

According to the invention, there is provided an error data correcting system in which a group of n data words W1 to Wn each including m bits has additionally a check code $$\left(P = \sum_{r=1}^{n} o\, W_r\right)$$

generated by adding the bits corresponding to the data words and another check code $$\left(Q = \sum_{r=1}^{n} oT^{(n+1)-r}\, W_r\right)$$

generated by adding the bits corresponding to the signals formed through the operation by an auxiliary matrix (T) of a polynomial $X^m + X^g + 1$, and wherein error words are corrected by using an M matrix generator for decoding. In such a system, a linear feedback shift register for $H(x) = X^m + X^g + 1$ is used for the M matrix generator for decoding. An initial data generator circuit sets the initial value of the linear feedback shift register to values necessary for decoding a specific data of the data to be decoded (a1, a2, ... $a_g$, ... $a_m$) or the values obtained by shifting the former values by one shift position in the reverse direction by the linear feedback shift register. By shifting the shift register in such a manner, the contents left therein are sequentially outputted and employed as selection signals from the linear feedback shift register, starting from the initial value or the value after an initial reverse shift.

Such an arrangement obviates the necessity of providing a larger-capacity ROM, address counters, etc., as in the conventional system and permits the provision of a simpler, high-speed, LSI version of a system with a drastic decrease in the number of elements.

BRIEF DESCRIPTION OF THE DRAWINGS

Other objects and features of the invention will be apparent from the following description taken in connection with the accompanying drawings, in which.

DETAILED DESCRIPTION OF THE PREFERRED EMBODIMENT

The principle of an error data correcting system involved in the present invention will first be described.

It is assumed that n data words and two parity check codes are expressed below and each data word is comprised of m bits.

$$\underbrace{W1, W2, \ldots Wn}_{\text{Data words}} \quad \underbrace{P, Q}_{\text{Check words}}$$

Here codes P and Q of the check words are expressed by $$P = \sum_{r=1}^{n} o \, W_r = W_1 \oplus W_2 \oplus \ldots \oplus W_n \quad (1)$$

$$Q = \sum_{r=1}^{n} o \, T^{(n+1)-r} W_r \quad (2)$$

$$= T^n W_1 \oplus T^{n-1} W_2 \oplus T^{n-2} W_3 \ldots \oplus T W_n$$

The parity check matrix of those codes is $$H \begin{bmatrix} \overbrace{I \;\; I \;\; I \;\; I \;\; I \;\; 0}^{n} \\ T^n \; T^{n-1} \; T \; 0 \; I \end{bmatrix}$$

where T is a Q generator matrix and I is a unit matrix.

This will be further described. Rewriting the equations (1) and (2), we have $$P \oplus \sum_{r=1}^{n} o \, W_r = 0 \quad (3)$$

$$Q \oplus \sum_{r=1}^{n} o \, T^{(n+1)-r} W_r = 0 \quad (4)$$

When the ith and jth data are dropped, the solutions of the equations (3) and (4) are not "0" but syndromes $S_1$ and $S_2$ given by equations (5) and (6). Assume again that the original data words are expressed by $W_1, W_2, \ldots (W_i) \ldots (W_j) \ldots W_n$ and the data words of which the ith and the jth data are dropped are expressed by $W'_1, W'_2 \ldots (W'_i) \ldots (W'_j) \ldots W'_n$, and that $W'_i = W_i + W_{ie}$, $W'_j = W_j + W_{je}$, and $W' = W$.

$$P \oplus \sum_{r=1}^{n} o \, W'_r = S_1 \quad (5)$$

$$Q \oplus \sum_{r=1}^{n} o \, T^{(n+1)-r} W'_r = S_2 \quad (6)$$

Further $$P \oplus \sum_{r=1}^{n} o \, W'_r = W_{ie} \oplus W_{je} = S_1 \quad (7)$$

$$Q \oplus \sum_{r=1}^{n} T^{(n+1)-k} W'_r = T^{(n+1)-i} W_{ie} \oplus T^{(n+1)-j} W_{je} \quad (8)$$

$$= S_2$$

From the equation (7), we have $$W_{ie} = S_1 \oplus W_{je} \quad (9)$$

putting the equation (9) into the equation (8), we have $$S_2 = T^{(n+1)-i}(S_1 \oplus W_{je}) \oplus T^{(n+1)-j} W_{je} \quad (10)$$

This equation can be rewritten as $$T^{i-(n+1)} S_2 = S_1 \oplus W_{je} \oplus T^{i-j} W_{je} \quad (11)$$

$$S_1 \oplus T^{i-(n+1)} S_2 = W_{je} \oplus T^{i-j} W_j = (I \oplus T^{i-j}) W_j \quad (11')$$

and hence $$W_{je} = (I \oplus T^{i-j})^{-1}(S_1 \oplus T^{i-(n+1)} S_2) \quad (12)$$

$$W_{ie} = S_1 \oplus W_{je} \quad (13)$$

As seen from the equations (12) and (13), the data dropped may be decoded by using the syndromes $S_1$ and $S_2$. The data words, when decoded, are $W_i + W_{ie}$ and $W_j + W_{je}$ and therefore if $W_{ie}$ and $W_{je}$ are decoded, the ith and jth words $W_i$ and $W_j$ may be decoded.

In this way, the correct original data words $W_i$ and $W_j$ may be decoded through the decoding of $W_{ie}$ and $W_{je}$. The system according to the present invention to be described below relates mainly to the generation of $W_{ie}$ and $W_{je}$.

Another decoding method may be considered. That is, when $S_1$ and $S_2$ are evaluated, information words are not all added together, but only the data words other than the error words are added together and $W_i$ and $W_j$ are directly decoded with the definitions $S'_1 = W_i \oplus W_j$ and $S'_2 = T^{(n+1)-i} W_i \oplus T^{(n+1)-j} W_j$.

The former decoding method in which the error data word is corrected with the definition $$P + \sum_{r=1}^{n} o \, W'_r = S_1$$

and $$Q + \sum_{r=1}^{n} o \, T^{(n+1)-r} W'_r = S_2,$$

will further be described in detail. In the description to be given, it is assumed that there are six data words in a group of N words, that each word includes 4 bits, and that the T matrix is given by $$T = \begin{bmatrix} 0 & 0 & 0 & 1 \\ 1 & 0 & 0 & 1 \\ 0 & 1 & 0 & 0 \\ 0 & 0 & 1 & 0 \end{bmatrix}$$

This matrix is an auxiliary matrix of a polynomial $1 + x + x^4$. Accordingly, if $B = TA$, the signals of the respective 4 bits are b1=a4, b2=a1⊕a4, b3=a2, b4=a3

Such a T matrix operation will be understood when considering Galois field $GF(2^4)$ formed by a polynomial ring with $F(x) = x^4 + x + 1$ as a modulus polynomial.

$$x^4 + x + 1 = 0, \; x^4 = x + 1$$

$$x(a1 + a2x + a3x^2 + a4x^3) = a1x + a2x^2 + a3x^3 + a4x^4 = a4 + (a1 + a4)x + a2x^2 + a3x^3$$

From the above-mentioned equations, it is seen that b1=a4, b2=a1+a4, b3=a2, and b4=a3.

Figure 1:
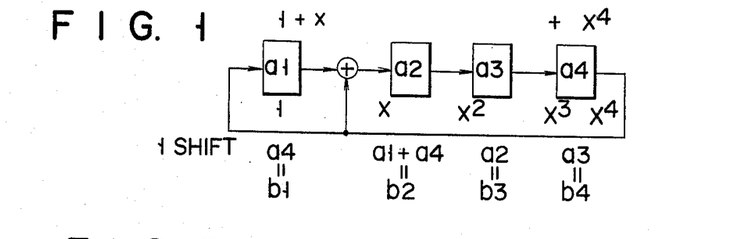
FIGS. 1 to 3 illustrate schematic diagrams of shift registers useful in explaining the principle of the data correcting system of the present invention.

Such an operation may be performed by using a shift register arranged in the form of a polynomial as shown in FIG. 1.

When data A is first loaded into the shift register and it is shifted by one, the T matrix of the data A is operated. When the data A is shifted by n the matrix becomes, $T^n A$.

The check codes P and Q of the data words $W_1$ to $W_6$ thus obtained are $$P = \sum_{r=1}^{6} o \, W_r = W_1 \oplus W_2 \oplus \ldots \oplus W_6 \quad (14)$$

$$Q = \sum_{r=1}^{6} o \, T^{7-i} W_r = T^6 W_1 \oplus T^5 W_2 \ldots \oplus T W_6 \quad (15)$$

Here, the P code is formed by addition of bits corresponding to the respective words $W_1$ to $W_6$. The addition is represented by $\oplus$, the ring addition exclusive OR of the corresponding bits, that is to say, the addition of mod 2. The Q code is generated by the data matrix operated by the shift register shown in FIG. 1.

In the correcting method as described above, data errors occurring in up to two words in the data words $W_1$ to $W_6$, will not prevent data words $W_1$ to $W_6$ may be completely decoded.

From the equations (12) and (13), we have $$W_{ie} = S_1 \oplus W_{je} \tag{16}$$

$$W_{je} = (I \oplus T_{i-j})^{-1}(S_1 \oplus T^{i-7}S_2) \tag{17}$$

when $S_1 \oplus T^{i-7}S_2 = m$, the equation (17) is rewritten as below $$W_{je} = (I \oplus T^{i-j})^{-1}(S_1 \oplus T^{i-7}S_2) = M_k \cdot m \tag{18}$$

where $$M_k = (I \oplus T^{-k})^{-1} \tag{19}$$

In the equation (19), $k = j - i$
When there are six data words, $M_k$ includes $M_1$ to $M_5$.

It is for this reason that an M matrix generator is generally used for decoding $W_i$ and $W_j$. Commonly, such data have not had predictable values and a restriction has been placed on the decoding process. For this reason, it is common practice that the matrix has been stored in a ROM.

The operation of $T^{-n}$ may be made by inverting the shift register shown in FIG. 1 in its connection, and shifting the one n times. When the T matrix is used as an auxiliary matrix of the polynomial $1 + x + x^4$, $M_1$ to $M_5$ are $$M_1 \begin{bmatrix} 1 & 1 & 1 & 1 \\ 1 & 0 & 0 & 0 \\ 1 & 1 & 0 & 0 \\ 1 & 1 & 1 & 0 \end{bmatrix}, \quad M_2 \begin{bmatrix} 0 & 1 & 0 & 1 \\ 1 & 1 & 1 & 1 \\ 0 & 1 & 1 & 1 \\ 1 & 0 & 1 & 1 \end{bmatrix}, \quad M_3 \begin{bmatrix} 1 & 0 & 0 & 1 \\ 1 & 1 & 0 & 1 \\ 0 & 0 & 1 & 1 \\ 0 & 0 & 1 & 0 \end{bmatrix},$$

$$M_4 \begin{bmatrix} 0 & 1 & 0 & 0 \\ 0 & 1 & 1 & 0 \\ 0 & 0 & 1 & 1 \\ 1 & 0 & 0 & 1 \end{bmatrix}, \quad M_5 \begin{bmatrix} 1 & 0 & 1 & 1 \\ 1 & 1 & 1 & 0 \\ 1 & 1 & 1 & 1 \\ 0 & 1 & 1 & 1 \end{bmatrix}$$

The actual flow of the decoded data will now be further described in detail. Assume now that data words $W_1$ to $W_2$ of the $W_1$ to $W_6$ are erroneous. Since $i = 1$ and $j = 2$, $k = 1$ by the equation $k = j - i$.
First $$W_{2e} = M_1(S_1 \oplus T^{-6}S_2)$$

$$W_{1e} = S_1 \oplus W_{2e}$$

and if $$S_1 = [S'_1, S'_2, S'_3, S'_4]$$

$$S_2 = [h_1, h_2, h_3, h_4]$$

$$W_{1e} = [a_1, a_2, a_3, a_4]$$

$$W_{2e} = [b_1, b_2, b_3, b_4]$$

we have $$S_1 = W_{1e} \oplus W_{2e}$$

$$S_2 = T^6 W_{1e} \oplus T^5 W_{2e}$$

$$S'_4 = a_4 \oplus b_4, \quad h_4 = a_2 \oplus a_1 \oplus a_4 \oplus b_3 \oplus b_2$$

$$S'_3 = a_3 \oplus b_3, \quad h_3 = a_1 \oplus a_3 \oplus b_2 \oplus b_1 \oplus b_4$$

$$S'_2 = a_2 \oplus b_2, \quad h_2 = a_4 \oplus a_2 \oplus b_1 \oplus b_3$$

$$S'_1 = a_1 \oplus b_1, \quad h_1 = a_3 \oplus a_2 \oplus b_4 \oplus b_3$$

$T^{-7}S_2$ obtained is $$T^{-7}S_2 = T^{-6}S_2 = T^{-6}(T^6 W_{1e} \oplus T^5 W_2) = W_{1e} \oplus T^{-1} W_{2e}$$

Therefore, if $$T^{-6}S_2 = [l_1, l_2, l_3, l_4]$$

$$T^{-6}S_2 = W_{1e} \oplus T^{-1}W_{2e}$$

$$l_4 = a_4 \oplus b_1$$

$$l_3 = a_3 \oplus b_4$$

$$l_2 = a_2 \oplus b_3$$

$$l_1 = a_1 \oplus b_2 \oplus b_1$$

Let us obtain m, i.e. $S_1 + T^{-6}S_2$.
$$S_1 \oplus T^{-6}S_2 = W_{1e} \oplus W_{2e} \oplus T^{-1}W_{2e} = W_{2e} \oplus T^{-1}W_{2e}$$

$$S_1 \oplus T^{-6}S_2 = W_{2e} \oplus T^{-1}W_{2e}$$

$$m_4 = b_4 \oplus b_1$$

$$m_3 = b_3 \oplus b_4$$

$$m_2 = b_2 \oplus b_3$$

$$m_1 = b_1 \oplus b_2 \oplus b_1$$

where $$m = [m_1, m_2, m_3, m_4].$$

From the equation (18), $W_{2e} = M_k \cdot m$ $$W_{2e} = (I \oplus T^{-1})^{-1}(S_1 \oplus T^{-2}S_2)$$

Here $M_1$ of the M matrix is used for $(1 \oplus T^{-1})^{-1}$.
When $m_1$ to $m_3$ of those $m_4$ to $m_1$ are all summed, $$\sum_{r=1}^{3} m_r = b_3 \oplus b_4 \oplus b_2 \oplus b_3 \oplus b_2 = b_4$$

Accordingly, $b_4$ may be decoded.
Similarly, $b_3$ is decoded by $m_1$ and $m_2$; $b_2$ by $m_1$; $b_1$ by $m_1$ to $m_4$. $W_{2e} = M \cdot m$ and M is already known as described above. Therefore, by multiplying $M_1$ by m, $W_{2e}$ may be decoded.

Before proceeding with the description of $M_1$ to $M_5$, the operation of the Galois field will be described. Also in this case, the Galois field $GF(2^4)$ is formed by the polynomial ring of which the modulus polynomial is $F(x)=x^4+x+1$. The expression of the Galois field $GF(2^4)$ is tabulated in the following table.

| Exponent of $\alpha$ | denear coupling of $1, \alpha, \alpha^2, \alpha^3$ | Vector expression |
|---|---|---|
| — | 0 | 0 0 0 0 |
| $\alpha^0$ | 1 | 1 0 0 0 |
| $\alpha^1$ | $\alpha$ | 0 1 0 0 |
| $\alpha^2$ | $\alpha^2$ | 0 0 1 0 |
| $\alpha^3$ | $\alpha^3$ | 0 0 0 1 |
| $\alpha^4$ | $1 + \alpha$ | 1 1 0 0 |
| $\alpha^5$ | $\alpha + \alpha^2$ | 0 1 1 0 |
| $\alpha^6$ | $\alpha^2 + \alpha^3$ | 0 0 1 1 |
| $\alpha^7$ | $1 + \alpha \quad + \alpha^3$ | 1 1 0 1 |
| $\alpha^8$ | $1 + \alpha^2$ | 1 0 1 0 |
| $\alpha^9$ | $\alpha + \alpha^3$ | 0 1 0 1 |
| $\alpha^{10}$ | $1 + \alpha + \alpha^2$ | 1 1 1 0 |
| $\alpha^{11}$ | $\alpha + \alpha^2 + \alpha^3$ | 0 1 1 1 |
| $\alpha^{12}$ | $1 + \alpha + \alpha^2 + \alpha^3$ | 1 1 1 1 |
| $\alpha^{13}$ | $1 \quad\quad \alpha^2 + \alpha^3$ | 1 0 1 1 |
| $\alpha^{14}$ | $1 \quad\quad\quad + \alpha^3$ | 1 0 0 1 |

In the table, $\alpha$ is a root in the Galois field $GF(2^4)$ of $x^4+x+1$. As seen from the vector expression, the multiplication of $\alpha^i$ by $\alpha$ is performed in a manner that the vector expression of $\alpha^i$ is set in the circuit shown in FIG. 2 and is shifted by one time. Accordingly, the multiplication of $\alpha^i$ by $\alpha^j$ is made by shifting it j times.

Figure 2:
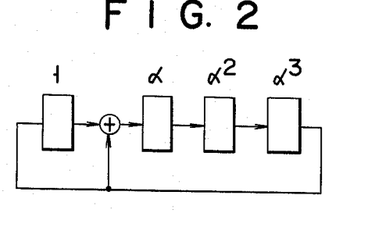

A circuit for effecting a division by $\alpha$, that is, the circuit for effecting $\alpha^{-1}$, may be realized by inverting the circuit in FIG. 2 in its connection. Here, if $x^4+x+1=0$ and $x=1/y$, we have $y^{-4}+y^{-1}+1=0$ if it is multiplied by $y^4$, $$y^4+y^3+1=0 \quad (20)$$

In this version of the equation, apparently, $\alpha^{15}=\alpha^0$. Further, $\alpha(1+\alpha^3)=\alpha+\alpha^4=1$ and, therefore, it is seen that $\alpha^{-1}$ is equal to $\alpha^{14}$.

If a dividend $\alpha^i=(a_1, a_2, a_3, a_4)=a_1+a_2x+a_3x^2+a_4x^3$, $$\begin{aligned}\alpha^i\alpha^{-1} &= (a_1 + a_2x + a_3x^2 + a_4x^3)(1 + x^3) \\ &= a_1 + a_2x + a_3x^2 + a_4x^3 + a_1x^3 + a_2x^4 + a_3x^5 + \\ &\quad a_4x^6 = (a_1 + a_2) + a_3x + a_4x^2 + a_1x^3\end{aligned} \quad (21)$$

When $F(x)=x^4+x^3+1$ is a modulus polynomial, $$x^4=1+x^3$$

$$\begin{aligned}\alpha^i\alpha^{-1} = \beta_i\beta &= (a_4 + a_3x + a_2x^2 + a_1x^3)x \\ &= a_4x + a_3x^2 + a_2x^2 + a_1x^4 \\ &= a_1 + a_4x + a_3x^2 + (a_1 + a_2)x^3\end{aligned} \quad (22)$$

Figure 3:
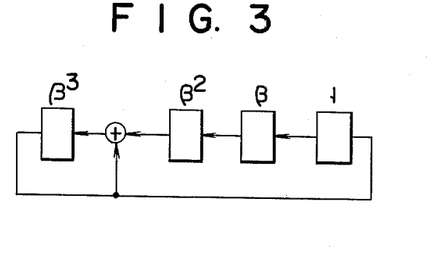

As seen from the above, the division is made by the inversion of the circuit. The circuit divided by $\alpha$ is shown in FIG. 3.

In view of the above-mentioned points, the M matrix in the equation (18) will be described.

$$W_{je}=(1 \oplus T^{i-j})^{-1}(S_1 \oplus T^{i-7}S_2) \quad (23)$$

where $$S_1+T^{i-7}S_2=(m_1, m_2, m_3, m_4)=m_1+m_2x+m_3x^2+m_4x^3 \quad (24)$$

In this case, i and j each range from 1 to 6 and accordingly $i-j=-1$ to $-5$.

When considering this in the Galois field $GF(2^4)$ with the modulus polynomial of $F(x)=x^4+x^3+1$, $$S_1 + T^{i-7}S_2 = m_4 + m_3x + m_2x^2 + m_1x^3 = \beta_i \quad (24)$$
$$W_{je} = (I + \beta^k)^{-1}\beta_i$$
$$(k = 1 \sim 5)$$

when $k = 1$, $$(1 \oplus \beta^k)^{-1} = \frac{1}{1+x} = \frac{x^4+x^3}{x+1} = x^3 \quad (25)$$

$$\begin{aligned}W_{je} &= x^3(m_4 + m_3x + m_2x^2 + m_1x^3) \\ &= m_4x^3 + m_3x^4 + m_2x^5 + m_1x^6 \\ &= m_4x^3 + m_3 + m_3x^3 + m_2 + m_2x + m_2x^3 + \\ &\quad m_1 + m_1x + m_1x^2 + m_1x^3 \\ &= (m_1 + m_2 + m_3) + (m_1 + m_2)x + m_1x^2 + \\ &\quad (m_1 + m_2 + m_3 + m_4)x^3\end{aligned} \quad (26)$$

Rewriting this into a linear coupling of the Galois field with the modulus polynomial of $F(x)=x^4+x+1$, we have $$W_{je}=(m_1+m_2+m_3+m_4)+m_1x+(m_1+m_2)x^2+(m_1+m_2+m_3)x^3 \quad (27)$$

It is seen that the equation (27) is equal to the $M_1$ matrix (or the vector diagram) of the M matrix. Similarly, when $k=2$, $$\begin{aligned}(1+\beta^2)^{-1} &= \frac{1}{x^2+1} = \frac{1^2}{x^2+1} = \frac{x^4+x^3}{(x+1)} \cdot \frac{x^4+x^3}{(x+1)} \\ &= x^3 \cdot x^3 = 1 + x + x^2 + x^3\end{aligned} \quad (28)$$

When the vector at this time is obtained, it is equal to the $M_2$ matrix of the M matrix.

When $k=1$, the multiplication of $x^3$ is made in $F(x)=x^4+x^3+1$. To be specific, $S_1+T^{i-7}S_2$ is set in the circuit of FIG. 3 at an inverse position and it is shifted three times. The signal remaining in the shift register after the shifting three times is $W_{je}$.

When $k=2$, the shift register is shifted six times.

In investigating the Galois field $GF(2^4)$ with the modulus polynomial of $F(x)=x^4+x+1$, from the equation (23), we have $$\begin{aligned}W_{je} &= (I \oplus T^{i-j})^{-1}(m_1 + m_2x + m_3x^2 + m_4x^3) \\ &= (1 + \alpha^{-1})^{-1}(m_1 + m_2x + m_3x^2 + m_4x^3) \\ &= (1 + 1 + x^3)^{-1}(m_1 + m_2x + m_3x^2 + m_4x^3) \\ &= (x^3)^{-1}(m_1 + m_2x + m_3x^2 + m_4x^3) \\ &= \frac{(x^4+x)^3}{(x)^3}(m_1 + m_2x + m_3x^2 + m_4x^3) \\ &= (1 + x + x^2 + x^3)(m_1 + m_2x + m_3x^2 + m_4x^3) \\ &= (m_1 + m_2 + m_3 + m_4) + m_1x + (m_1 + m_2)x^2 \\ &\quad + (m_1 + m_2 + m_3)x^3\end{aligned} \quad (29)$$

Accordingly, the equation (29) is equal to the equation (27).

In other words, $(S_1 \oplus T^{i-7}S_2)=(m_1, m_2, m_3, m_4)$ is set in the shift register shown in FIG. 2 and $(1+x+x^2=\alpha^{12})$ is shifted therein 12 times. At this time, the data left in the shift register is $W_{je}$, as seen from the above-mentioned table.

As seen from the foregoing description, the decoding may be performed on the basis of the polynomial which the matrix T depends on. Accordingly, it is evident that the decoding may be made by the shift register connected in the polynomial manner.

As seen from the foregoing description, it is apparent that the vector space in the Galois field $GF(2^4)$ with the modulus polynomial of $F(x)=x^4+x+1$ develops the T matrix, the $M_1$ to $M_5$ matrixes and a $T^{-1}$ matrix to be described later.

In the operation of $T^{-1}$, $F(x)=x^4+x^3+1$ is used and this is a reciprocal polynomial for $F(x)=x^4+x+1$. Further, it is evident that the view of the position of the original data is merely inverted.

Further, it is apparent that, when each data is comprised of 4 bits, the polynomial is of the fourth degree, and when the operation circuit is implemented by a shift register decoding the polynomial requires 15 shift operations. That is, the operation of two elements a and b allows the maximum 15 shifts when the operation circuit is a shift register.

Moreover, when the operation circuit is embodied as shift registers, if the degree of the polynomial is large, it is necessary to shift the shift register by $2^{12}$ to $2^{14}$, so that the decoding operation takes a long time. When data is transmitted by PCM or the like, time for the decoding processing is limited. It is for this reason that the M matrix for decoding, such as the $M_1$ to $M_5$ matrixes, are loaded into a ROM (read only memory) and are sequentially read out to select the signal $S_1+T^{j-(n+1)}S_2$ and decode it. A ROM capable of adequately performing in this manner is a physically large hardware element.

The explanation to follow is how a data correcting method is applied to an error data correcting system according to the present invention.

As described above, the check code Q depends on the auxiliary matrix of the polynomial $X^m+X^g+1$. It is also seen from the foregoing description that the M matrix to be corrected is on the space vector generated in the Galois field ($2^m$) with the polynomial of $x^m+x^g+1$. For this reason, with the initial value set to a given value, the M matrix for decoding is generated by an M matrix generator implemented by a linear feedback shift register designed to output $H(x)=X^m+X^g+1$. However, to perform the matrix operation, the data generated by the linear feedback shift register must have already been generated.

This will be described in detail by rewriting the T matrix as below.

$$T = \begin{bmatrix} & a_1 & a_2 & a_3 & a_4 \\ B_1 & 0 & 0 & 0 & 0 \\ b_2 & 1 & 0 & 0 & 1 \\ b_3 & 0 & 1 & 0 & 0 \\ b_4 & 0 & 0 & 1 & 0 \end{bmatrix}$$

Figure 4:
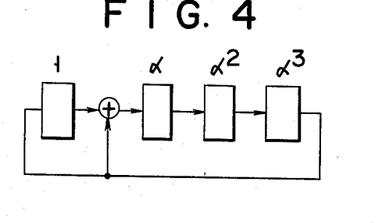
FIGS. 4 and 5 illustrate schematic diagrams for explaining the principle of an error data correcting system according to the present invention.

In the T matrix thus rewritten, column a employs $F(x)=x^4+x+1$ as a modulus polynomial. Accordingly, in the circuit shown in FIG. 4, only the register 1 is set to "1" and then when it is shifted by one, the column $a_1$ is generated. Similarly, the column $a_2$ is generated for two shifts; the column $a_3$ is generated for three shifts; the column $a_4$ is generated for four shifts.

Let us consider a signal at the cross-point of $b_3$ and $a_4$. The signal at this cross-point corresponds to that at the cross-point of $b_2$ and $a_3$. The signal at the cross-point of $b_2$ and $a_3$ corresponds to the sum of the signals at the cross-points $b_4$ and $a_2$ and $b_1$ and $a_2$. The signal at the cross-point of $b_1$ and $a_2$ corresponds to that at the cross-point of $b_4$ and $a_1$. Therefore, the signal at the cross-point of $b_3$ and $a_4$ corresponds to the sum of the signals at the cross-points $b_4$ and $a_1$ and $b_4$ and $a_2$. Similarly, the signal for the $b_3$ and $a_3$ combination corresponds to that for the $b_4$ and $a_4$ combination; the signal for the $b_3$ and $a_2$ combination to that for the $b_4$ and $a_3$ combination; the signal for the $b_3$ and $a_1$ combination to that for the $b_4$ and $a_2$ combination.

In this manner, the column $b_3$ is obtained. Similarly, the column $b_2$ may be obtained.

Figure 5:
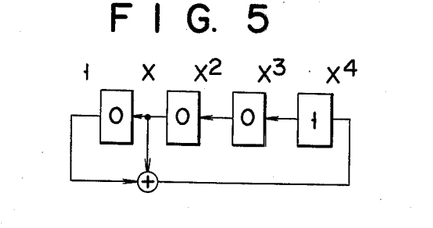

This relation may be expressed in terms of a circuit, as illustrated in FIG. 5. This circuit is a linear feedback shift register of $H(x)=x^4+x+1$.

In the circuit of FIG. 5, when 0001 is set in the shift register and is shifted four times, the vectors thereof are tabulated below.

```
              a1 a2 a3 a4
   b1' 4 shift  0  0  1  1
   b2' 3 shift  1  0  0  1
   b3' 2 shift  0  1  0  0
   b4' 1 shift  0  0  1  0
                0  0  0  1
```

Comparing this with the T matrix rewritten as mentioned above, only the columns $b_1'$ and $b_1$ are different from each other. Since the signal for the $b_2$ and $a_4$ is the sum of the signals for the $b_4$ and $a_5$, and $b_1$ and $a_3$ combinations, the signal for the $b_1$ and $a_3$ combination must be the sum of the signals for the $b_4'$ and $a_3$ combination and the $b_2'$ and $a_4$ combination. Accordingly, it is evident that the column $b_1$ may be obtained by adding $b_1'$ and $b_4'$.

With respect to the development of vectors, the same thing is true for the selection matrix for the M matrix decoding, except for the initial value.

When the order of the decode is not considered, there is no need for the addition of $b_1'$ and $b_4'$ if the column $b_1$ is set as the initial value.

Figure 6:
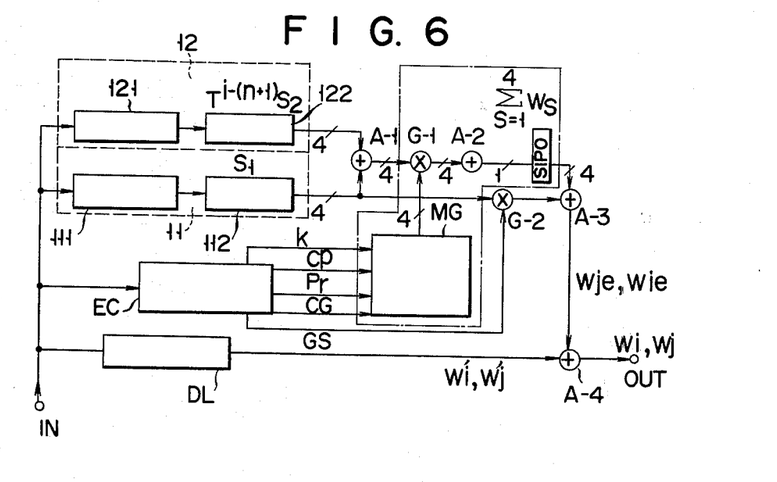
FIG. 6 shows a block diagram of an error data correcting system according to the present invention.

FIG. 6 shows a block diagram of an error data correcting system based on the principle as described above. A data input signal to be corrected is applied to an input terminal (IN) of the error data correcting system. In the data input signal, n data words and two check words expressed by $W_1$ to $W_n$ are used as one block and each word is comprised of 4 bits. The data input signal is supplied to a P decoder (11) and a Q decoder (12), which operate in bit parallel and word serial modes. Upon receipt of the data input signal, the P decoder (11) produces the syndrome ($S_1$) and the Q decoder (12) produces $T^{i-(n+1)}S_2$. The P decoder (11) is comprised of a register (111) for performing an addition (exclusive OR) as described above and a buffer (112). The Q decoder (12) is comprised of a register (121) for performing an addition (exclusive OR) attendant with the matrix operation as described above and a buffer (122).

The $S_1$ and $T^{i-(n+1)}S_2$ values decoded and generated are both applied to an adder (A-1) where they are added to each other. The added data is sequentially selected from a gate circuit (G-1) by a selecting signal produced from an M matrix generator (MG) comprised of a linear feedback shift register to be described later. The M matrix generator is controlled by an error word control circuit (EC), and the output of the matrix generator and the adder A-1 are added by an adder (A-2), so that $W_{je}$ is decoded and generated. $W_{je}$ is generally shifted in bit serial format.

In this case, if $S_1 \oplus T^{i-(n+1)}S_2=(m_1, m_2, m_3, m_4)$, when $j-i$ is 1, the M matrix generator MG produces an $M_1$ matrix selection signal in the M matrix. The lowermost row of the $M_1$ matrix and $S_1+T^{i-(n+1)}S_2$ are multiplied by the gate circuit (G-1), so that $m_1 \times 1 = W_1$, $m_2 \times 1 = W_2$, $m_3 \times 1 = W_3$, $M_4 \times 0 = 0 = W_4$. $W_1$ to $W_4$ are all sum by the adder (A-2) and the summed is transferred to a serial-to-parallel converter (SIPO) where $b_4$ of the $W_{je}$ is decoded.

Then, the M matrix generator (MG) produces the second row 1100 from the bottom of the matrix and $b_3$ of the $W_{je}$ is decoded. Subsequently, $b_2$ and $b_1$ of the $W_{je}$ are decoded through a similar procedure.

$W_{je}$ after decoding and generating is added to $S_1$ in the adder (A-3), so that the $W_{ie}$ is decoded and generated. In this case, $S_1$ is applied to the adder (A-3), through a gate circuit (G-2) enabled by a signal derived from the error control circuit (EC).

Part of the input data signal is directly applied to an adder (A-4) through a delay circuit (DL) after a delay of one data block. When the input data signal has no error, the decoding section produces "0". In this case, the input data signal is derived directly from the output terminal (OUT).

When the first error word, $W_{ij}$ is received, the decoded $W_{ie}$ is transferred to an adder (A-4), so that the correct data $W_i$ is reproduced and derived from the output terminal (OUT). When the second error word $W_j'$ is received, the gate circuit (G-2) is disabled and therefore the addition of $S_1$ is not performed in the adder (A-3), so that $W_{je}$ is transferred directly to the adder (A-4). As a result, the correct data $W_j$ is reproduced and derived from the output terminal (OUT).

As recalled, $W_{ie}$ and $W_{je}$ designate the dropped or missing ith and jth data words. Accordingly, through the above-mentioned operation, the data words $W_1$ to $W_n$ including such error data are correctly decoded.

The error word control circuit (EC) controls the M matrix generator (MG) in such a way that the interval between the error words, i.e., the information $k$ ($=j-i$), is checked and the M matrix is produced corresponding to the interval checked. This may easily be realized by detecting a cyclic redundancy check signal appended to the input data signal by a cyclic redundancy check code generating circuit including a shift register functioning as an error pointer. In addition to the k data and a gate signal (GS), the error word control circuit (EC) produces a clock pulse (Cp), a preset pulse (Pr), and a gate control signal (CG), which are used in embodiments to be described later. Such a pulse generating function may be accomplished by using a known pulse generating device.

An embodiment of the M matrix generator (MG) and the decoding section will be described in detail referring to FIG. 7. It will expressly be understood that, in the description to follow, the T matrix is treated as an auxiliary matrix for the polynomial $x^4+x+1$, and the data words $W_1$ to $W_n$ comprise six data words each including 4 bits. The ith and jth data words are dropped, i.e. in error. An initial data generating circuit 22 including an inverter ($I_1$) and OR circuits ($OR_1$) to ($OR_3$) checks the interval $k$ ($=j-i$) between the dropped data words $W_i$ to $W_j$. When $k=1$, the initial data generating circuit 22 sets 1111 in flip-flops $FF_1$ to $FF_4$ of a linear feedback shift register 21 for the M matrix generator (MG) as the initial data state. When $k=2$, it sets 1010 into the same flip-flops. As shown, the linear feedback shift register 21 is comprised of the flip-flops $FF_1$ to $FF_4$ and an exclusive OR gate, $EX-OR_1$. Similarly, a selection signal necessary to decode the data word $W_1$ is set in the flip-flops.

Every time a clock pulse Cp is received, the flip-flops $FF_1$ to $FF_4$ produce signals to select the data words $W_4$, $W_3$ and $W_2$.

The selection of the data word $W_{je}$ from $S_1+T^{i-7}S_2$ applied from the adder ($A_1$) by this signal is performed by AND gates $G_{11}$ to $G_{14}$ corresponding to the gate circuit (G-1). The output signals from the gates are added by the exclusive OR gates, $EX-OR_2$ to $EX-OR_4$ to decode the data $W_{je}$ in a bit serial manner.

The decoded data is transferred to flip-flops $FF_a$ to $FF_b$ comprising the serial input parallel output converter (SIPO) and as it is shifted four times, to generate the data word $W_{je}$.

Figure 7:
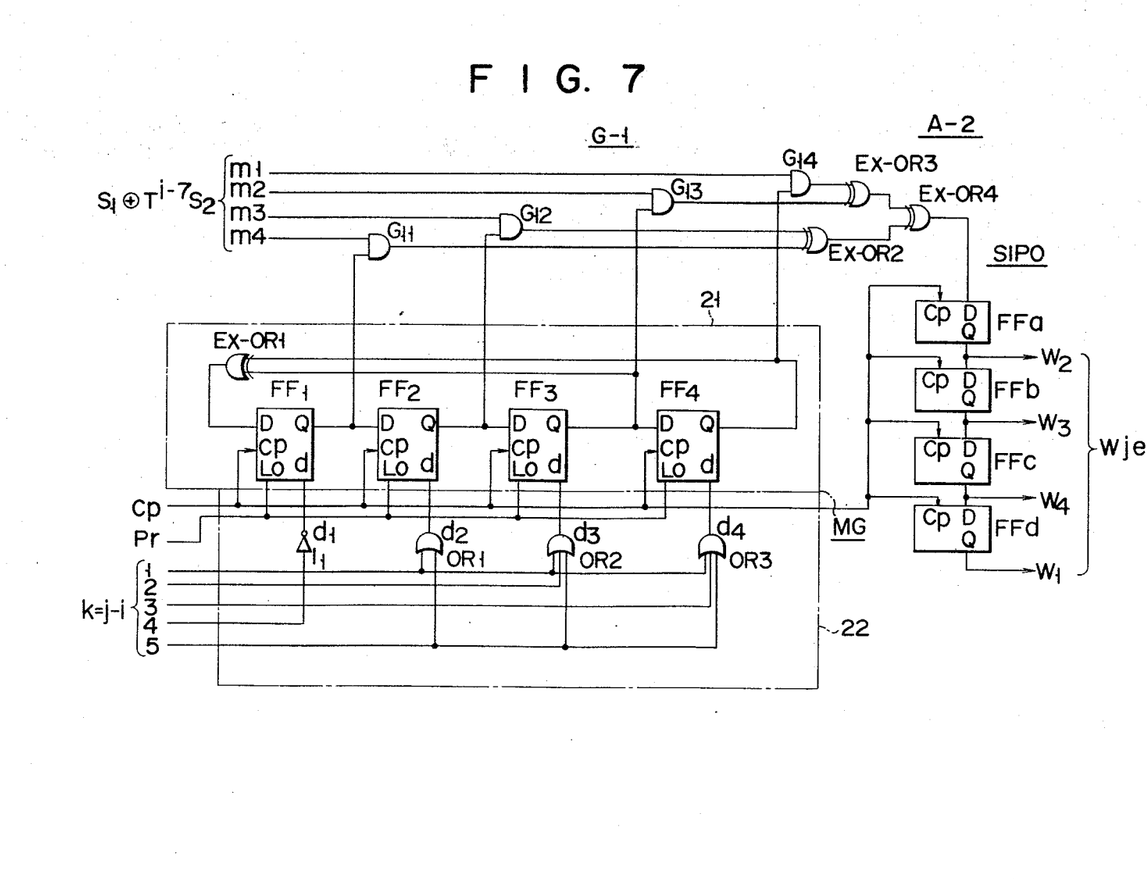
FIG. 7 shows a block diagram of an M matrix generator for decoding and a decoding section used in the circuit shown in FIG. 6.

In FIG. 7, Pr is a signal to preset the initial value (a selection signal to the uppermost row, or $W_1$, of the M matrix 3 of the M matrix in this embodiment) at the first stage of the decoding operation. Cp is a clock pulse for reading out $W_1$, $W_4$, $W_3$ and $W_2$ and is set in the flip-flops $FF_1$ to $FF_4$ as a selection signal to decode $W_1$ by the first preset signal Pr.

At an instant that the first clock pulse Cp sets $W_1$ to the flip-flop $FF_a$, it is changed into a selection signal to decode $W_4$ in the $FF_1$ to $FF_4$. When the flip-flops second pulse Cp sets $W_1$ in the flip-flop $FF_b$ and the $W_4$ in the flip-flop $FF_a$, the contents of the flip-flops $FF_1$ to $FF_4$ simultaneously change the selection signal to decode $W_3$. Subsequently, $W_3$ and $W_2$ are set into the flip-flops $FF_a$ to $FF_d$, so that the decoding data are set therein by four clock pulses Cp such as $FF_a(W_2)$, $FF_b(W_3)$, $FF_c(W_4)$ and $FF_d(W_1)$.

Explanation will be given about the decoding of the error data components $W_{2e}$ and $W_{5e}$ of the $W_2'$ and $W_5'$ as specific examples. In this case, the error words are the second and fifth words, so that $k=j-i=3$. Further, $m_1=1$, $m_2=1$, $m_3=1$ and $m_4=0$.

Firstly, the flip-flops $FF_1$ to $FF_4$ are set to the values $FF_1=1$, $FF_2=0$, $FF_3=0$ and $FF_4=1$, through the inverter ($I_1$) and the OR circuits $OR_1$ to $OR_3$ by the preset signal (Pr), although the preset data control signals 1, 2, 4 and 5 are "0" and only the signal 3 is "1". The contents of the flip-flops $FF_1$ to $FF_4$ are transferred as inputs to first terminals of the corresponding gate circuits ($G_{11}$) to ($G_{14}$) also receiving at second terminals $m_1$ to $m_4$ of the $S_1 \oplus T^{i-7}S_2$ lines, respectively.

Here, the $G_{11}$ output is $m_4 \times FF_1$="0"$\times$"1"=0; the $G_{12}$ output is $m_3 \times FF_2 = 1 \times 0 = 0$; the $G_{13}$ output is $m_2 \times FF_3 = 1 \times 0 = 0$; the $G_{14}$ output is $m_1 \times FF_4 = 1 \times 1 = 1$. The output signals of $G_{11}$ to $G_{14}$ are all added, by the exclusive OR gate $EX-OR_4$.

Accordingly, under this condition, when the clock pulse Cp is received, the flip-flop $FF_a$ is set to "1" and simultaneously the flip-flops $FF_1$ to $FF_4$ are set to "1", "1", "0" and "0". The signals of the $m_4$ to $m_1$ and $FF_1$ to $FF_4$ are transferred to the gates $G_{11}$ to $G_{14}$, so that the gate $EX-OR_4$ produces an output "1". When the clock pulse Cp is received again, the flip-flop $FF_a$ stores "1" and "1" as previously stored in $FF_a$ before it is set is transferred to the flip-flop $FF_b$. Simultaneously, the flip-flops $FF_1$ to $FF_4$ are set to 0110. Similarly, the gate $EX-OR_4$ produces an output signal "0". Then, the next clock pulse Cp sets the $FF_a$ to "0" and the $FF_b$ and $FF_c$ to "1".

As a result, $FF_1$ to $FF_4$ are 1011 and the gate $EX-OR_4$ becomes "0". When the next Cp appears, the data is transferred to the $FF_a$, so that $FF_a$ to $FF_d$ are set to 0011. In other words, $W_1=1$, $W_2=0$, $W_3=0$ and $W_4=1$ and this state expressly indicates the $W_{5e}$ itself.

As seen from the circuit of FIG. 6, in decoding the data word $W_2$ the $W_2'$, $W_{5e}$ and $S_1$ are added by the gate circuit (G-2) and the adders (A-3) and (A-2). As previously stated, $S_1 = W_{2e} \oplus W_{5e}$ $$W_{2e} = S_1 \oplus W_{5e}$$
$$= [0011] \oplus [1001]$$
$$= [1010]$$

With this contents, we have $$W_2 = W_2' \text{ and } W_{2e}$$
$$= [1000] + [1010]$$
$$= [0010]$$

Additionally, the data word $W_5$ is $$W_5 = W_5' + W_{5e}$$
$$= [1110] + [1001]$$
$$= [0111]$$

Figure 8:
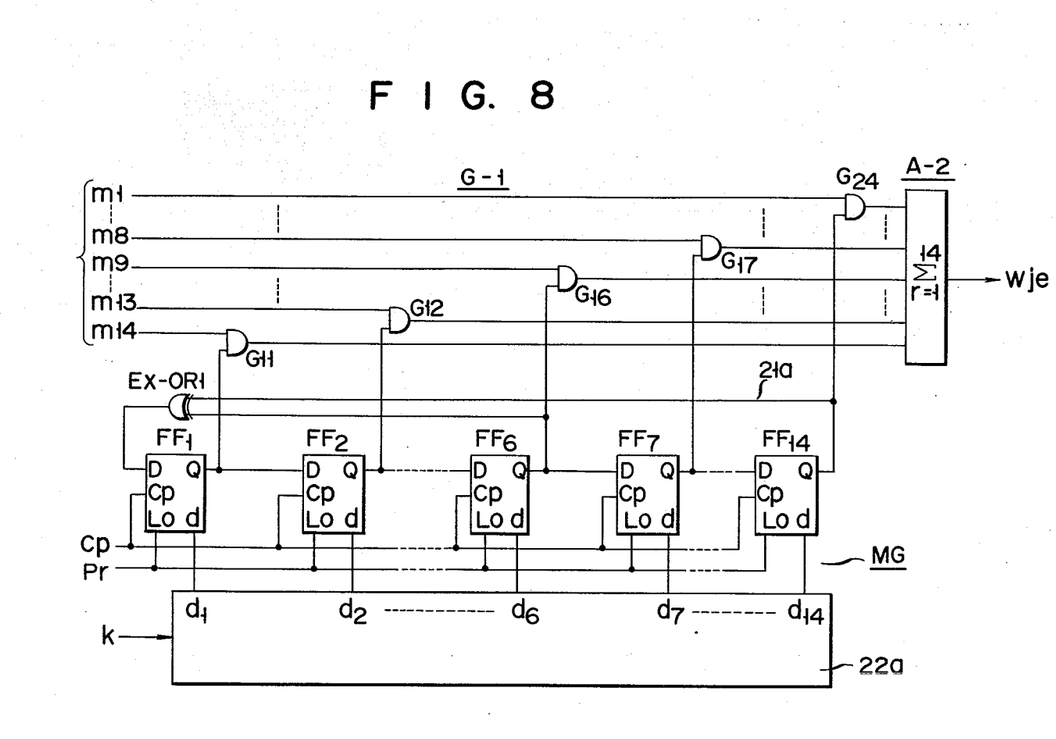
FIGS. 8 to 12 show block diagrams of other examples of M matrix generators for decoding.

In this way, the original signal $W_2$ and $W_5$ may be decoded. The number of the data words and the number of bits of one word may be properly selected. For example, the circuit construction required when a data word comprises 14 bits is illustrated in FIG. 8. The circuit shown in FIG. 8 may be considered as a simple extension of that of FIG. 7.

In the foregoing description, the initial value of the linear feedback shift register 21 is set with the data $a_g$ of the data to be decoded $a_1, a_2, a_3, \ldots a_g \ldots a_n$. However, when the initial value is set with the data $a_1$ and the shift direction of the shift register is reversed, the decoded data are obtained in the order of $a_1, a_2, \ldots a_{g-1}, a_{g+1} \ldots a_m, a_g$.

The major feature of this embodiment resides in that the data are decoded in the order of $a_g, a_m, a_{m-1}, \ldots a_{g+1}, a_{g-1} \ldots a_2, a_1$ or in the reverse order, or that, to obtain the column $b_1$, the $b_1$ row ($=a_g$) or the $b_2$ row is set as the initial value of the linear feedback shift register 21, without adding $b_1'$ and $b_4'$.

Another embodiment of the invention will be described referring to FIG. 9. The assumption similar to that of FIG. 7 is also employed in this embodiment. As shown, a linear feedback shift register 31 for the M matrix generator (MG) is comprised of flip-flop circuits $FF_1$ to $FF_4$, exclusive OR circuits $EX\text{-}OR_1$, and $EX\text{-}OR_5$ to $EX\text{-}OR_8$ and AND gates $G_a$-$G_d$. An initial data generator circuit 32 is comprised of inverters $I_1$ and $I_2$, and OR circuits $OR_2$ and $OR_3$. Depending on the data $k(=j-i)$ applied from the error word control circuit (EC), the initial data generator circuit 32 sets a selection signal to decode the data word $W_4(W_n)$ in the linear feedback shift register 31 as the initial value, by signals $d_1$ to $d_4$. In this case, the setting of the initial value is of course made by a preset signal Pr. The initial value set is 0111 when k=1; it is 1101 when k=2; it is 1100 when k=3. Similarly, a selection signal to decode $W_4$ is set.

Every time the clock pulse Cp is supplied, the flip-flops $FF_1$ to $FF_4$ produce signals corresponding to the data words $W_4$ to $W_2$.

In response to this signal, the selection to decode $W_{je}$ from the $S_1 \oplus T^{i-7}S_2$ is performed by the AND gates $G_{11}$ to $G_{14}$ corresponding to the gate circuit (G-1). The output signals of those gates are summed by the exclusive circuits $EX\text{-}OR_2$ to $EX\text{-}OR_4$ corresponding to the adder circuit (A-2), with the result that the data $W_{je}$ is decoded into bit serial data.

In this case, however, the linear feedback shift register 31 produces the vector values obtained when the shift register in FIG. 5 is shifted four times. Accordingly, the data words $W_4$ to $W_2$ are decoded but the data word $W_1$ is not decoded since the signal $b_1$ to decode $W_1$ is not generated.

In this embodiment, when the third shift pulse Cp is generated, the gate control signal CG is made "1" and the initial value data $b_4$ is added to the D input of the flip-flops $FF_1$ to $FF_4$ through the AND gates $G_a$ to $G_d$, thereby to produce the $b_1$. By using the $b_1$, $W_1$ is decoded.

In this way, the data words $W_4$, $W_3$ and $W_1$ are decoded subsequently.

The explanation to follow is for a process to decode only the error components $W_{j2}$ and $W_{j5}$ of the data words $W_2'$ and $W_5'$. In this case, the error words are the second and fifth words, $k=j-i=5-2=3$.

When k=3, only the line 3 is "1" and the remaining lines are "0". Accordingly, 1100 are set in the flip-flops $FF_1$ to $FF_4$ by a preset signal Pr. The outputs of the flip-flops $FF_1$ to $FF_4$ and the signals $m_4$ to $m_1$ of the $S_1 \oplus T^{i-7}S_2$ are ANDed together by gates $G_{11}$-$G_{14}$. As a result, the output of $G_{11}$ is $m_4 \times FF_1 = 0 \times 1 = 0$; the output of $G_{12}$ is $m_3 \times FF_2 = 1 \times 1 = 1$; the output of $G_{13}$ is $m_2 \times FF_3 = 1 \times 0 = 0$; the output of $G_{14}$ is $m_1 \times FF_4 = 1 \times 0 = 0$. When the outputs $G_{11}$ to $G_{14}$ are all summed by the gates $EX\text{-}OR_2$ to $EX\text{-}OR_4$. $0 \oplus 1 \oplus 0 \oplus 0 = 1$ and therefore the data word $W_4$ is produced. When the clock pulse Cp is received, the flip-flops $FF_1$ to $FF_4$ are 0110. During this the signal CG is "0".

In other words, the Q output signal of $FF_1$ shifted to $FF_2$; the Q output signal of $FF_2$ is shifted to $FF_3$ is shifted; the Q output signal of $FF_3$ to $FF_4$; the result of the addition of the Q outputs signals of $FF_3$ and $FF_4$ is shifted to $FF_1$.

As a result, the outputs of those flip-flops $FF_1$ to $FF_4$ and the signals $m_4$ to $m_1$ are ANDed together and the results of the ANDed ones are summed to be "0", so that $W_3$ generated.

Similarly, in response to the clock pulse Cp, the flip-flops $FF_1$ to $FF_4$ are 1011 and are ANDed together with the signals $m_4$ to $m_1$ so that the result of the addition of those ANDed ones becomes "0" and the word $W_2$ is generated. Then, every time the clock pulse Cp is received, the signal CG is made "1".

In response to the clock pulse Cp, the addition of the initial data set in the flip-flops $FF_3$, $FF_4$ and $FF_1$, $1 \oplus 1 \oplus 1 = 1$, is set in the flip-flop $FF_1$. The addition of the output data of the flip-flop $FF_1$ and the initial data of the flip-flop $FF_2$, i.e. $1 \oplus 1 = 0$, is set in the flip-flop $FF_2$. The addition of the output data of the flip-flop $FF_2$ and the initial value of the flip-flop $FF_3$, $0 \oplus 0 = 0$, is set in the flip-flop $FF_3$. The addition of the output data of the flip-flop $FF_3$ and the initial value of the flip-flop $FF_4$, i.e. $1 \oplus 0 = 1$, is set in the flip-flop $FF_4$. Through those setting of the flip-flops, the flip-flops $FF_1$ to $FF_4$ are 1001.

Those output signals of the flip-flops and the signals $m_4$ to $m_1$ are ANDed together and summed to be "1", so that the data word $W_1$ is sent out.

In this way, $W_4=1$, $W_3=0$, $W_2=0$ and $W_1=1$ as the data word $W_{5e}$ is generated.

As seen from FIG. 6, the decoding of $W_2$ is realized by the addition of $W_{5e}$, $W_2'$ and $S_1$.

Since $S_1 = W_{2e} \oplus W_{5e}$, $$W_{2e} = S_1 \oplus W_{5e}$$
$$= [0011] \oplus [1001]$$
$$= [1010]$$

Hence $$W_2 = W_2' \oplus W_{2e}$$
$$= [1000] \oplus [1010]$$
$$= [0010]$$

The signal $W_5$ is $$W_5 = W_5' \oplus W_{5e}$$
$$= [1110] \oplus [1001]$$
$$= [0111]$$

In this way, the original signals $W_2$ and $W_5$ may be decoded.

Figure 9:
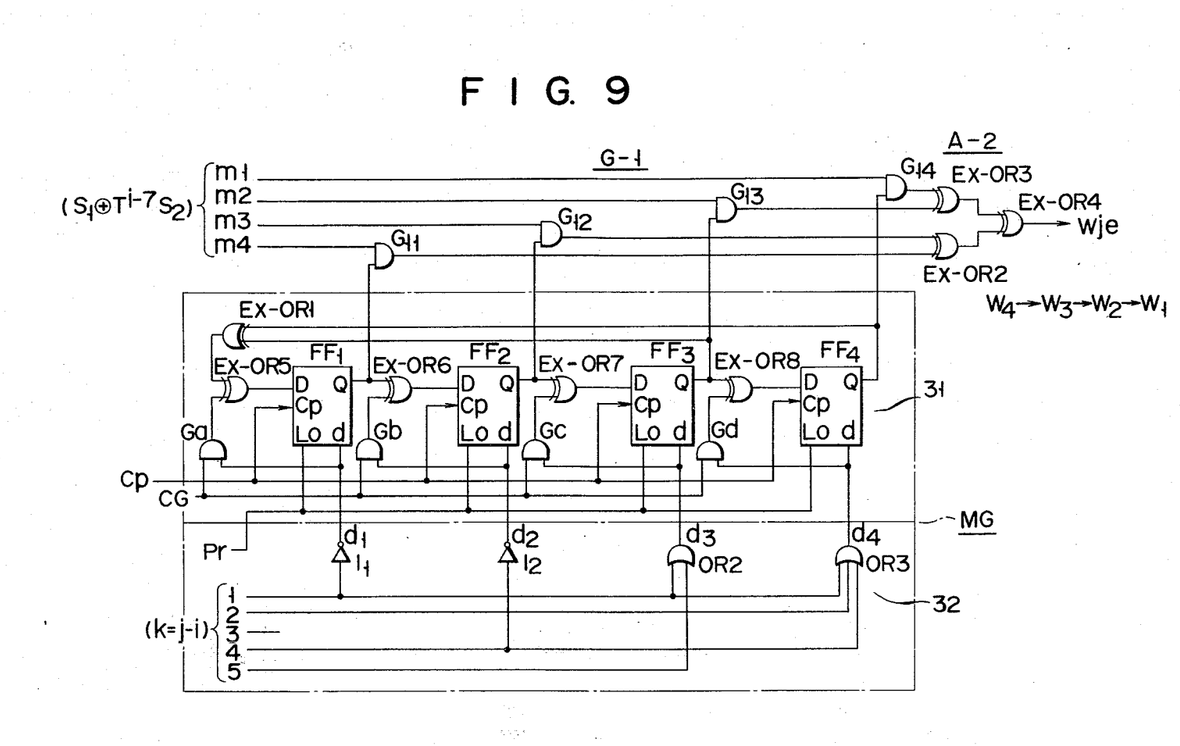
Figure 10:
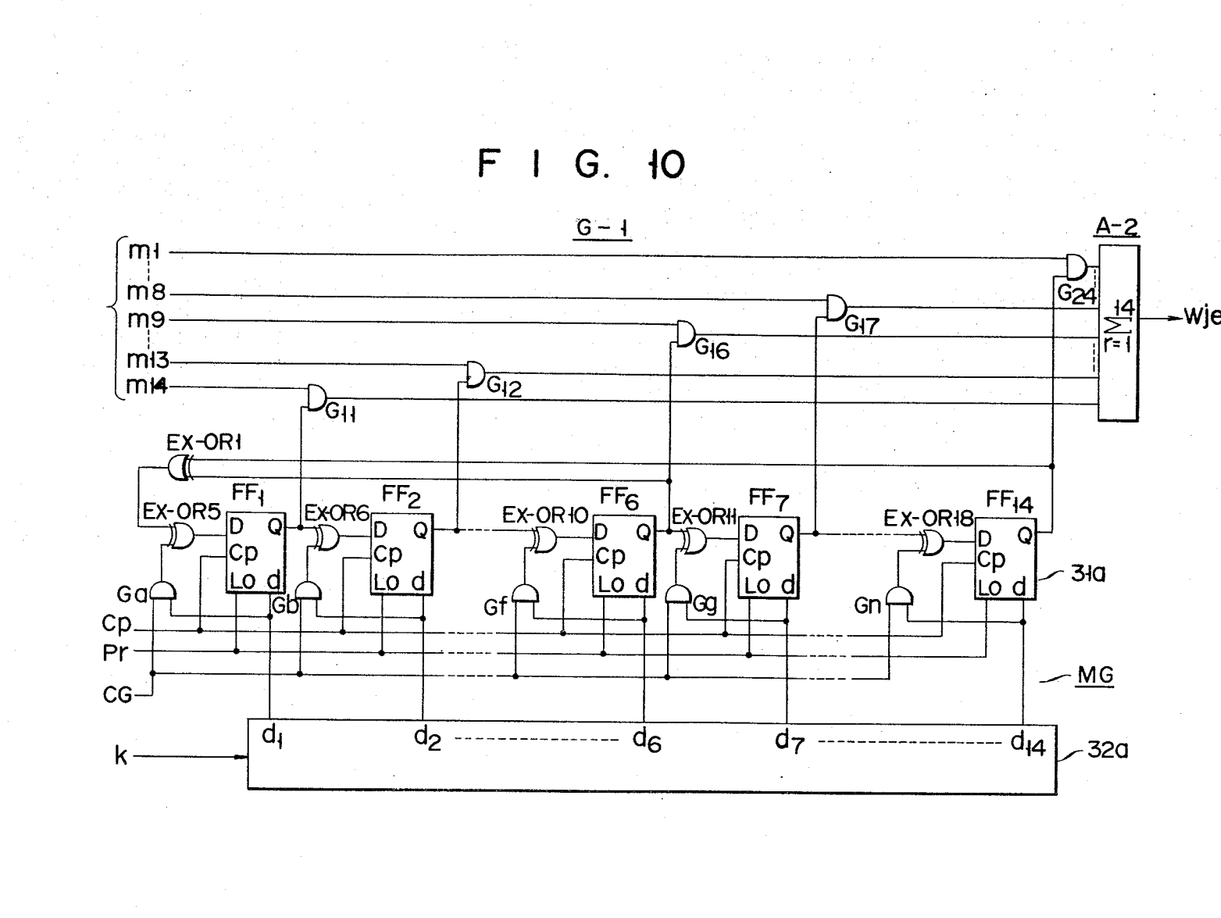

In the embodiment shown in FIG. 9, the number of the data words and the number of the bits of one word may properly be selected as required. An example when one word is comprised of 14 bits is illustrated in FIG. 10. As shown, the circuit construction of the FIG. 10 is a mere extension of the circuit construction shown in FIG. 9.

In the above-mentioned embodiment, the initial value of the linear feedback shift register 31 is set with the data $a_m$ of those data to be decoded $a_1, a_2, a_3, \ldots a_g, \ldots a_n$. However, when the initial value is set with the data $a_1$ and the shift direction of the shift register is reversed, the decoded data are obtained in the order of $a_1, a_2, a_3, \ldots a_{g-1}, a_{g+1}, \ldots a_m, a_g$.

The major feature of this embodiment resides in that the data are decoded in the order of, $a_m, a_{m-1}, \ldots a_{g+1}, a_g, a_{g-1}, \ldots a_2, a_1$ or in the reverse order. To obtain the column $b_1$, $b_1'$ and $b_4'$ are added and $a_m$ or $a_1$ is set with the initial value of the linear feedback shift register 31.

Figure 11:
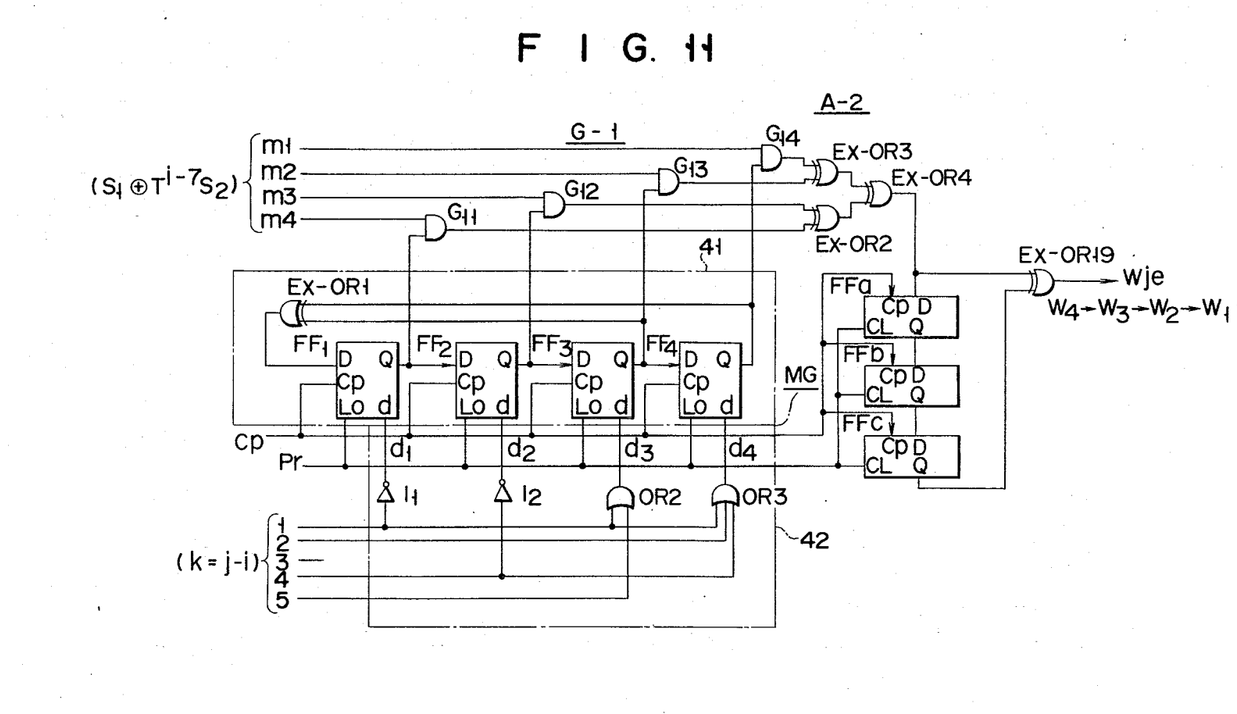

Referring now to FIG. 11, there is shown another embodiment of the error data correcting system according to the invention. The assumption similar to that of FIG. 7 is also employed in this embodiment.

As shown, a linear feedback shift register 41 for the M matrix generator (MG) is comprised of flip-flops (FF$_1$) to (FF$_4$) and an exclusive OR circuit (EX-OR$_1$). An initial data generator circuit 42 is comprised of inverters (I$_1$) and (I$_2$) and the OR circuits (OR$_2$) and (OR$_3$). Depending on the data k (=j−i) applied from the error data control circuit (EC) shown in FIG. 6, a selection signal to decode $W_4(W_n)$ is set as the initial value by signals $d_1$ to $d_4$ in the linear feedback shift register 41. The setting of the shift register 41 is of course made by the preset signal (Pr). The preset signal (Pr) is used to set the initial value in flip-flops (FF$_a$) to (FF$_c$) to be described later and clears the flip-flops. The initial value set in the flip-flops is 0111 when k=1; it is 1101 when k=2; it is 1100 when k32 3. Similarly, a selection signal to decode the signal $W_4$ is set therein.

Every time the clock pulse (Cp) comes in, the flip-flops (FF$_1$) to (FF$_4$) produce signals ($W_4$) to ($W_2$).

The selection of the data $W_{je}$ from the $S_1 + T^{i-7}S_2$ by this signal is made by the AND gates (G11) to (G14) corresponding to the gate circuit (G-1). The addition of the output signals from the AND gates (G1) to (G4) is made by the exclusive OR gate (EX-OR$_2$) to (EX-OR$_4$) corresponding to the adder (A-2), so that the data ($W_{je}$) is decoded in a bit serial manner.

However, in this case, the linear feedback shift register 41 produces the vector values when the shift register shown in FIG. 5 is shifted four times. Accordingly, the ($W_4$) to ($W_2$) are decoded but the ($W_1$) is not decoded since the ($b_1$) to decode the ($W_1$) is not generated.

The embodiment described above does not produce the output signal from the exclusive OR gate (EX-OR$_4$) directly, but the output of gate EX-OR$_4$ is supplied to the flip-flops (FF$_a$) to (FF$_c$). The exclusive OR gate (EX-OR$_{19}$) adds the output of EX-OR$_4$ and FF$_c$ to decode $W_1$.

The flip-flops (FF$_a$) to (FF$_c$) are cleared simultaneously with the setting of the initial values of the flip-flops (FF$_1$) to (FF$_4$). The linear feedback shift register 41 generates the signal ($b_1'$), not the signal ($b_1$) to decode ($W_1$), after the selection signals to decode ($W_4$), ($W_3$) and ($W_2$) are generated. The addition of ($W_1'$) and ($W_4$) selected and decoded by ($b_1'$) is equivalent to decoding ($W_1$) by adding ($b_1'$) and ($b_4'$).

By adding ($W_4$) and ($W_1'$) left in the flip-flop (FF$_c$) by the exclusive OR gate (EX-OR$_{19}$), even when the linear feedback shift register 41 produces ($b_1'$), ($W_1$) is decoded, so that, as a whole, ($W_4$), ($W_3$), ($W_2$) and ($W_1$) are decoded in this order.

The decoding of the error data components $W_{2e}$ and $W_{5e}$ of the $W_2'$ and $W_5'$ will now be described. Since the error words are the second and fifth words, k=5−2=3, only the line 3 of the initial preset data of the FF$_1$ to FF$_4$ is "1". The remaining lines are "0", FF$_1$=1, FF$_2$=1, FF$_3$=0 and FF$_4$=0. This state of those flip-flops is set up by the preset signal Pr. At the same time, the flip-flops FF$_a$ to FF$_c$ are cleared.

Here, since $m_1=1$, $m_2=1$, $m_3=1$, and $m_4=0$, the output of gate G$_{11}$ is $m_4 \times FF_1=0 \times 1=0$; the output of gate G$_{12}$ is $m_3 \times FF_2=1 \times 1=1$; the output of gate G$_{13}$ is $m_2 \times FF_3=1 \times 0=0$; the output of gate G$_{14}$ is $m_1 \times FF_4=1 \times 0=0$. Those outputs are all added, $0+1 \oplus 0 \oplus 0=1$, and the result of the addition is delivered to the gate EX-OR$_{19}$. Here, the flip-flop FF$_c$ is "0" and therefore "1" of the $W_4$ is generated first. In this condition, when the clock pulse Cp comes in, the output of the gate EX-OR$_4$ is set in the flip-flop FF$_a$ while at the same time the flip-flops FF$_1$ to FF$_4$ are set to 0110, respectively.

Those output signals are similarly applied to the gates G$_{11}$ to G$_{14}$ to select the signals $m_4$ to $m_1$. Since they are added, the output of gate EX-OR$_4$ becomes $0 \oplus 1 \oplus 1 \oplus 0=0$. The output signal is added to the output ("0") of the flip-flop FF$_c$, so that $W_3=0 \oplus 0=0$ is sent out. With the next clock pulse Cp, FF$_a$=0 and FF$_b$=1, so that FF$_1$ to FF$_4$ are 1011: Similarly, those outputs are transferred to the gates G$_{11}$ to G$_{14}$ where they are ANDed with the signals $m_4$ to $m_1$. The outputs of the AND gates G$_{11}$–G$_{14}$ are all added. Here, the output of the exclusive OR gate EX-OR$_4$ is $0 \oplus 0 \oplus 1 \oplus 1=0$. This signal is added to the output (0) of the flip-flop FF$_c$, $0 \oplus 0=0$, and the result of the addition is generated as $W_2$.

When the clock pulse Cp sets the FF$_a$ to FF$_c$ to 0, 0 and 1, FF$_a$=0, FF$_b$=0 and FF$_c$=1, the flip-flops FF$_1$ to FF$_4$ are immediately set to 0101, respectively. Those outputs are transferred to the gates G$_{11}$ to G$_{14}$ where they are ANDed with the signals $m_4$ to $m_1$. The outputs of the AND gates G$_{11}$—G$_{14}$ added, $0 \oplus 1 \oplus 0 \oplus 1=0$. In other words, the output of the gate EX-OR$_4$ becomes "0". As a result of the addition of the output "0" of the gate EX-OR$_4$ and the output "1" of the flip-flop FF$_c$, the gate EX-OR$_{19}$ produces $0 \oplus 1=1$, i.e. $W_1$. In this way, $W_4=4$, $W_3=0$, $W_2=0$, and $W_1=1$, as $W_{5e}$, are decoded.

As seen from FIG. 6, to decode $W_2$, $W_{5e}$ and $S_1$ are first summed to give $W_{2e}$. Next, $W_{2e}$ is summed with $W_2'$ to give $W_2$. Since $S_1 = W_{2e} \oplus W_{5e}$, $$W_{2e} = S_1 \oplus W_{5e}$$
$$= [0011] \oplus [1001]$$
$$= [1010]$$

From this, we have $$W_2 = W_2' \oplus W_{2e}$$
$$= [1000] \oplus [1010]$$
$$= [0010]$$

The signal $W_5$ is given $$W_5 = W_5' \oplus W_{5e}$$
$$= [1110] \oplus [1001]$$
$$= [0111]$$

In this way, the original signals $W_2$ and $W_5$ are decoded.

Figure 12:
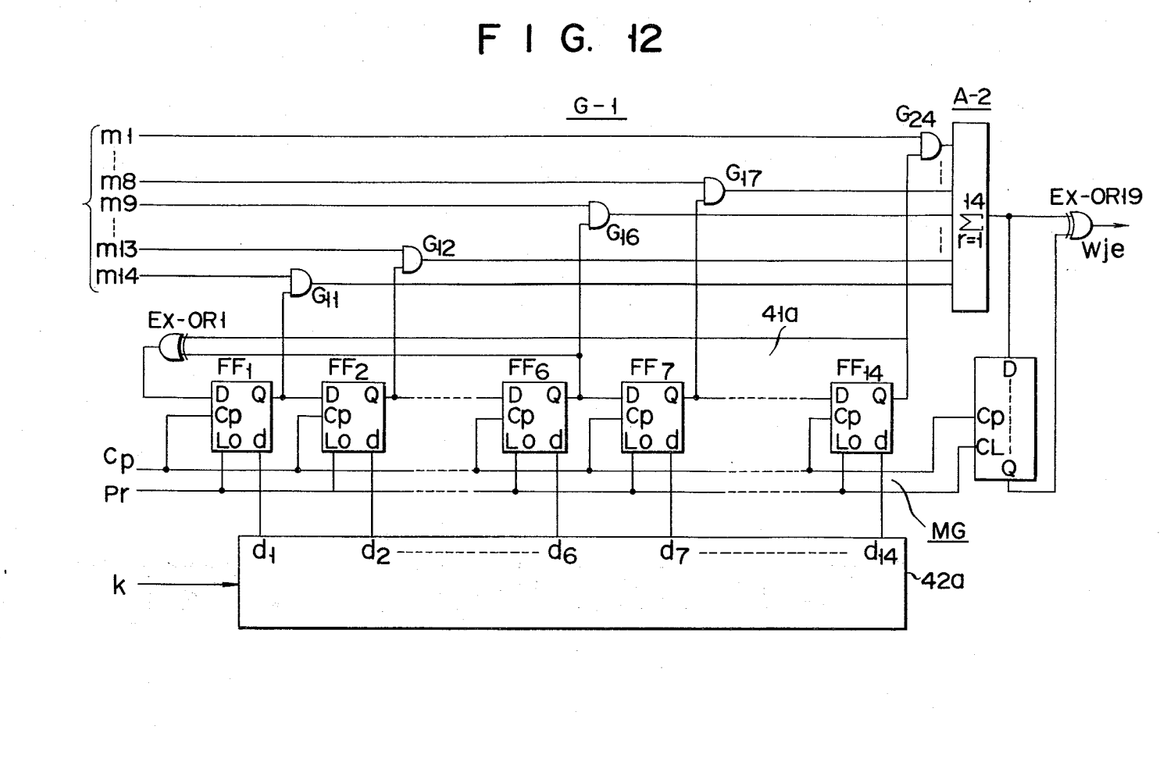

In the embodiment of FIG. 11, the number of the data words and the number of bits of one word may properly be selected as required. An example of the circuit construction when 14 bits are used for one word is illustrated in FIG. 12. As seen from the figure, the circuit construction shown in FIG. 12 is a mere expansion of the circuit shown in FIG. 11.

In the embodiment shown in FIG. 11 or FIG. 12, the initial value of the linear feedback shift register 41 is set with the data $a_m$ of those data to be decoded $a_1, a_2, a_3, \ldots a_g, \ldots a_n$. However, when the initial value is set with the data $a_1$ and the shift direction of the shift register is reversed, the decoded data are obtained in the order of $a_1, a_2, a_3, \ldots a_{g-1}, a_{g+1}, \ldots a_m, a_g$.

The major feature of this embodiment resides in that in order to obtain the column $b_1$ for decoding the data in the order of $a_m, a_{m-1}, \ldots a_{g+a}, a_g, a_{g-1} \ldots a_2, a_1$ or in the reverse order, $W_1'$ and $W_4$ are added in place of the addition of $b_1'$ and $b_4'$ to obtain equivalently $W_1$, and $a_m$ or $a_l$ is set with the initial value of the linear feedback shift register 41.

The M matrix generator for decoding using the linear feedback shift register is applicable for the system for directly decoding $W_i$ and $W_j$ without adding all of the data words.

The error data correcting circuit is well adapted for a system for transmitting, recording or reproducing digitized information signals by PCM, for example. It is evident that the invention is applicable for other suitable digital systems within the scope of the invention.

As described above, according to the invention, in constructing the M matrix generator for decoding, a large capacitive ROM is not needed and hence the M matrix generator thus constructed is simple in construction and exhibits high speed in data processing. Further, when the matrix is fabricated by LSI technology, the number of the components needed is considerably reduced. Accordingly, the error data correcting circuit with the linear feedback shift register realized by the invention has such excellent features.

What is claimed is:

1. An error data correcting system in which a group of n data words ($W_1$) through ($W_n$) each including m bits has associated therewith a P check code $$\left( P = \sum_{r=1}^{n} W_r \right)$$

and a Q check code $$\left( Q = \sum_{r=1}^{n} T^{(n+1)-r} W_r \right)$$

the system being capable of correcting erroneous data words $W_{ie}$ and $W_{je}$, the system comprising:
first means for decoding said P check code to generate a first syndrome data word $S_1$;
second means for decoding said Q check code to generate a second syndrome data word $S_2$;
first means for summing corresponding bits in said syndrome data words $S_1$ and $S_2$ to produce a syndrome sum data word;
M matrix generator means for generating an M matrix corresponding to $M(x) = X^m + X^g + 1$;
means for controlling said M matrix generator means to produce M matrix selector signals;
second means for summing said syndrome sum data word and said M matrix selector signal to generate a first intermediate data word $W_{jc}$;
third means for summing $W_{je}$ and $S_1$ to generate a second intermediate data word, $W_{ic}$; and
means for combining (1) the data words $W_{je}$ and $W_{jc}$ to produce corrected data word $W_j$, and (2) the data words $W_{ie}$ and $W_{ic}$ to produce the corrected data word $W_i$.

2. A data correcting system according to claim 1 wherein said M matrix generator means comprises a linear feedback shift register.

3. A data correcting system according to claim 2 wherein said controlling means includes means for setting said linear feedback shift register to a value corresponding to the difference in relative positions i, j of said erroneous data words $W_{ie}$ and $W_{je}$ respectively, in said group of n data words.

4. A data correcting system according to claim 2 wherein said linear feedback shift register has a forward shift direction and a reverse shift direction and wherein said controlling means includes means for establishing an initial value in said linear feedback shift register by shifting the contents thereof one position in said reverse direction.

* * * * *